(12) United States Patent
Anders

(10) Patent No.: US 9,022,190 B2
(45) Date of Patent: May 5, 2015

(54) SYSTEM FOR TRANSFERRING ENERGY TO A VEHICLE AND METHOD OF OPERATING THE SYSTEM

(75) Inventor: Dominik Anders, Mannheim (DE)

(73) Assignee: Bombardier Transportation GmbH, Berlin (DE)

( * ) Notice: Subject to any disclaimer, the term of this patent is extended or adjusted under 35 U.S.C. 154(b) by 274 days.

(21) Appl. No.: 13/515,887

(22) PCT Filed: Dec. 21, 2010

(86) PCT No.: PCT/EP2010/007986

§ 371 (c)(1),
(2), (4) Date: Aug. 30, 2012

(87) PCT Pub. No.: WO2011/076434

PCT Pub. Date: Jun. 30, 2011

(65) Prior Publication Data

US 2013/0112519 A1    May 9, 2013

(30) Foreign Application Priority Data

Dec. 21, 2009    (GB) .................................. 0922315.7

(51) Int. Cl.
*B60L 5/00* (2006.01)
*B60M 1/34* (2006.01)
*B60M 3/04* (2006.01)

(52) U.S. Cl.
CPC .............. *B60L 5/005* (2013.01); *Y10T 29/4902* (2015.01); *B60M 1/34* (2013.01); *B60M 3/04* (2013.01); *B60L 2200/26* (2013.01)

(58) Field of Classification Search
CPC ........... B60L 5/005; B60L 13/00; B60M 1/34

USPC ............................................................ 191/10
See application file for complete search history.

(56) References Cited

U.S. PATENT DOCUMENTS

| | | | | |
|---|---|---|---|---|
| 3,503,025 A | * | 3/1970 | Weinfurt | 336/57 |
| 4,495,781 A | | 1/1985 | Gatling | |
| 4,741,388 A | | 5/1988 | Kuroiwa | |
| 5,722,204 A | * | 3/1998 | Stieb et al. | 52/20 |

(Continued)

FOREIGN PATENT DOCUMENTS

| | | |
|---|---|---|
| CN | 1242880 A | 1/2000 |
| DE | 3814789 A1 | 11/1989 |

(Continued)

*Primary Examiner* — Zachary Kuhfuss
(74) *Attorney, Agent, or Firm* — The Webb Law Firm

(57) ABSTRACT

A system for transferring energy to a vehicle, in particular a track bound vehicle, such as a light rail vehicle, wherein the system includes an electric conductor arrangement adapted to produce an electromagnetic field which can be received by the vehicle thereby transferring the energy to the vehicle the system further includes electric and/or electronic devices which are adapted to operate the electric conductor arrangement. The devices produce heat while operating the conductor arrangement and—therefore—are to be cooled. A cooling arrangement of the system includes a structure having a cavity in which at least one of the devices to be cooled is located. The structure includes a cover limiting the cavity at the top, wherein the device(s) to be cooled is/are located at a distance to the cover. The structure is integrated in the ground at the path of travel of the vehicle in such a manner that the cover forms a part of the surface of the ground.

15 Claims, 4 Drawing Sheets

(56) References Cited

U.S. PATENT DOCUMENTS

| | | | |
|---|---|---|---|
| 6,230,861 B1 | 5/2001 | Cornic | |
| 6,382,378 B1 * | 5/2002 | Cornic | 191/6 |
| 6,427,466 B1 | 8/2002 | Livni | |
| 6,691,766 B1 * | 2/2004 | Azar | 165/45 |
| 7,614,943 B2 * | 11/2009 | Lee | 454/184 |
| 8,718,418 B2 * | 5/2014 | Haefner et al. | 385/12 |
| 2004/0112601 A1 | 6/2004 | Hache | |
| 2006/0000628 A1 | 1/2006 | Lee | |
| 2011/0253495 A1 * | 10/2011 | Vollenwyder et al. | 191/10 |
| 2012/0055751 A1 | 3/2012 | Vollenwyder et al. | |

FOREIGN PATENT DOCUMENTS

| | | | | |
|---|---|---|---|---|
| DE | 69929353 T2 | 9/2006 | | |
| EP | 0681939 A1 | 11/1995 | | |
| FR | 2680919 A1 | 3/1993 | | |
| GB | 2396203 A | 6/2004 | | |
| GB | 2463692 A | 3/2010 | | |
| GB | 2463693 A * | 3/2010 | | B60L 5/00 |
| JP | 55126765 A | 9/1980 | | |
| JP | 564323 A | 3/1993 | | |
| WO | 9823017 A1 | 5/1998 | | |
| WO | 0133584 A1 | 5/2001 | | |
| WO | 2010031596 A2 | 3/2010 | | |

* cited by examiner

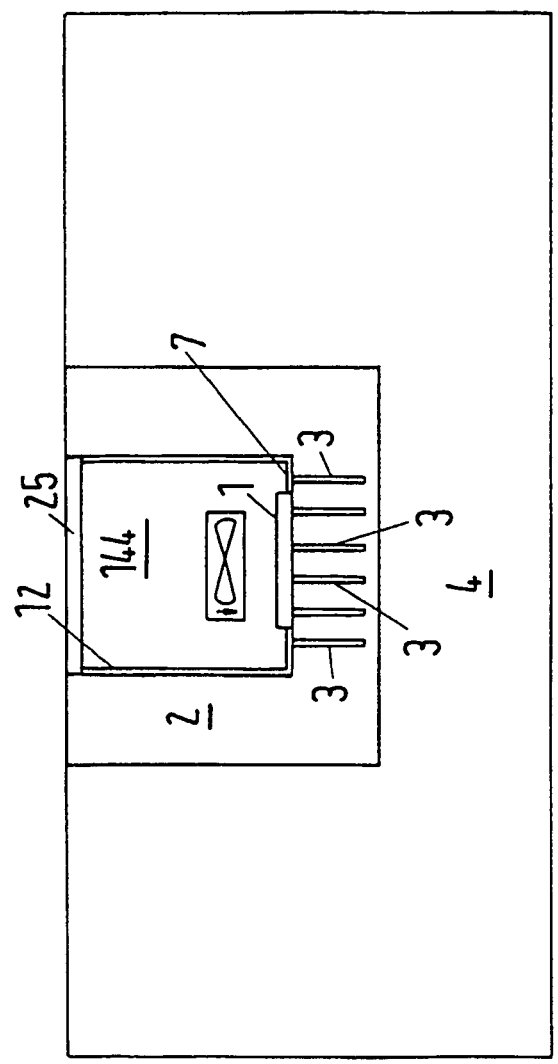
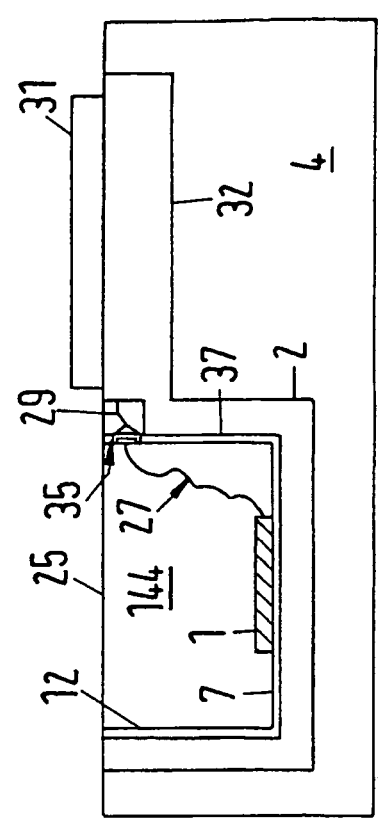

SYSTEM FOR TRANSFERRING ENERGY TO A VEHICLE AND METHOD OF OPERATING THE SYSTEM

BACKGROUND OF THE INVENTION

1. Field of the Invention

The invention relates to a system for transferring energy to a vehicle, in particular a track bound vehicle, such as a light rail vehicle. In particular, the light rail vehicle may be a tram. The invention further relates to a method of operating such a system and it relates to a method of manufacturing such a system.

2. Description of Related Art

Trams are usually provided with electric energy via a pantograph which contacts a conductor like an overhead line or a live rail. However, under specific circumstances such as within the historic centre of a city such conductors are undesired for aesthetic reasons. On the other hand, live rails which are buried in the ground cause safety problems.

To overcome this problem, energy can be transferred inductively to the vehicle. A track side conductor arrangement produces an electromagnetic field. The field is received by a coil on board of the vehicle so that the field produces an electric voltage by induction. The transferred energy may be used for propulsion of the vehicle and/or for other purposes such as providing auxiliary systems of the vehicle (e.g. the heating and ventilating system) with energy.

The system for transferring the energy to the vehicle which comprises the electric conductor arrangement may also comprise electric and/or electronic devices which are adapted to operate the electric conductor arrangement. One of the devices may be an inverter for generating an alternating current from a direct current. The direct current may be carried by a supply line which supplies electric energy to the conductor arrangement. The alternating current may be the current which is carried by the conductor arrangement to produce the electromagnetic field. Since comparatively high powers are required by the vehicle, a corresponding power inverter produces significant losses in form of heat power. However, the electric and/or electronic device for operation of the electric conductor arrangement may comprise other types of devices, such as power switches to switch on and off a section of the electric conductor arrangement, detection devices for detecting the presence of a vehicle and other devices.

These devices can be arranged in boxes or other casings above ground. Therefore, the heat losses produced by the devices can easily be transferred to the ambience. However, this may result in unacceptable noise production if ventilators are used to force the cooling. Furthermore, especially within historic parts of cities, casings above ground are not acceptable. On the other hand, burying the devices in the ground deteriorates the heat transfer to the ambience. Typical ground materials such as soil, rocks and sand are poor heat conductors.

It is an option to bury the devices directly in the ground. DE 699 29 353 T2 discloses to bury a transformer directly in the ground, wherein the primary and secondary winding of the transformer are cast in an insulating material, whereas the magnetic core of the transformer is uncovered in order to transfer heat to the surrounding soil. However, directly burying the devices for operating the conductor arrangement makes it difficult to perform maintenance of the devices and replacement of parts, if necessary. Furthermore, especially electronic devices such as semiconductor switches would require at least some kind of protection against water and dirt. In addition, the thermal conductivity of natural ground materials is small and the heat is therefore badly removed from the transformer.

SUMMARY OF THE INVENTION

It is an object of the present invention to provide a system of the kind indicated above, wherein the devices which are to be cooled do not require above ground casings, but are efficiently cooled. Furthermore, it shall be possible to perform maintenance and repair of the devices with low effort. It is a further object to provide a method of operating such a system and to provide a method of manufacturing such a system.

It is a basic idea of the present invention to use a cavity in the ground for accommodation of the device or devices to be cooled. The cavity is closed by a cover at the top of the cavity and the cover forms a part of the surface of the ground. "Part of the surface" includes the case that some loose particles such as soil or dirt may be present on top of the cover. However, it is preferred that such a layer of particles is thinner than 1 cm, preferably thinner than 0.2 cm. Preferably, the cover is made by a material or made by materials which has/have a significantly higher heat transfer coefficient than natural ground material, such as soil, rocks and sand. "Significantly" means that the heat transfer coefficient is greater by at least a factor of five, preferably ten. A preferred material for the cover is metal, for example steel.

The term "ground" includes manmade or artificial grounds, such as parts of a railway track. For example, the natural ground may be removed and the railway track may be built at the place instead, including the ground defining the cavity. A further example of an artificial ground is any manmade ground within a city.

Placing the devices to be cooled within a cavity in the ground removes the devices from sight. Such an arrangement is therefore acceptable even for historic parts of cities. There is no above-ground space consumption. Furthermore, since there is a cover at the top of the cavity, the effort for removing the cover in order to perform maintenance and/or repair of the device or devices is comparatively small. In addition, the cover can be adapted to carry any weight or load, including vehicles, such as road automobiles or track bound vehicles which shall be provided with electric energy using the electric conductor arrangement.

The inventors have recognised the fact that the devices to be cooled produce heat only temporarily, while a vehicle is travelling in the vicinity of the electric conductor arrangement. Permanently operating the conductor arrangement would cause massive energy losses and would produce undesired electromagnetic fields. It is preferred that the electric conductor arrangement is operated only while a vehicle is travelling directly above the conductor arrangement. In order to control the temporary operation of the electric conductor arrangement, at least one of the devices to be cooled which is located in the cavity can be used. For example, an inverter of the kind mentioned above can be switched off so that the inverter does not feed the electric conductor arrangement with electric energy from the power supply line.

In particular, a system for transferring energy to a vehicle is proposed, wherein the vehicle may be a track bound vehicle, such as a light rail vehicle, wherein the system comprises an electric conductor arrangement adapted to produce an electromagnetic field which can be received by the vehicle thereby transferring the energy to the vehicle, the system comprises electric and/or electronic devices which are adapted to operate the electric conductor arrangement wherein the devices produce heat while operating the conductor arrangement and—therefore—are to be cooled, a cooling arrangement of the system comprises
a structure having a cavity in which at least one of the devices to be cooled is located,
wherein the structure comprises a cover limiting the cavity at the top, wherein the device(s) to be cooled is/are located at a distance to the cover
wherein the structure is integrated in the ground at the path of travel of the vehicle in such a manner that the cover forms a part of the surface of the ground.

The structure which has the cavity may be any structure, in particular a structure of solid material. The structure may be monolithic, may consist of one or more than one materials and/or may have walls with or without openings. For example, such an opening of a wall may be used for receiving wires and/or cables for electrically connecting the device or devices to external equipment. A preferred material of the structure is metal, since metal has generally good heat conducting properties which accelerate heat transfer from the cavity to the surrounding and which help avoiding hot spots within the material of the structure. According to a specific embodiment, the structure may have five planar walls extending perpendicularly to the respective neighbouring walls, wherein the five walls form a bottom wall and four side walls. The structure is open at the top and the cover closes the cavity during operation. The cover can be removed to give access to the interior of the cavity, especially for maintenance and repair of the device or devices which are to be cooled within the cavity. For example, the height of the structure may be in the range of 20 cm to 1.5 m, preferably 30-50 cm, the widths of the structure may be in the range of 30 to 70 cm, preferably about 50 cm, and/or the length of the structure may be in the range of 60 cm to 1.5 m, preferably about 80 cm.

Preferably, the soil around the location where the cavity is to be placed is compressed before the structure is buried in the soil. Optionally, additional material can be buried as well, as will be described below. The soil and/or the other material on the outer side of the structure is used as a heat storage. The major part of the heat which is produced by the device or devices within the cavity is transferred to the surrounding via the cover, either directly or after being transferred to the soil or other material outside of the structure. For example, if heat cannot be transferred directly to the surrounding via the cover, because the ambience air temperature is too high or because sunshine has heated up the cover, a significant amount of the produced heat is transferred to the soil and/or other material outside of the structure and is transferred back to the interior of the structure or to the walls or other elements of the structure as soon as it is possible to transfer the heat to the surrounding via the cover. Since the heat transfer coefficient of soil is small, very little heat can be dissipated in the ground for good. The same applies to a rocky or sandy ground or mixtures of soil, rocks and/or sand.

At least one of the devices to be cooled may be an inverter adapted to invert a direct current carried by a supply line into an alternating current carried by the conductor arrangement, wherein the inverter is electrically connected to the conductor arrangement. Inverters produce particularly high amounts of heat per time interval, especially when they provide an alternating current for producing an electromagnetic field that is used for propulsion energy transfer. Other examples of devices are given above.

It is preferred that the device or devices to be cooled is/are not only located at a distance to the cover, but the device or devices is/are located at the bottom of the cavity. In particular, the device(s) may be placed on
a heat conducting material extending downwardly through a bottom region material of the structure, or
a bottom region material of the structure, wherein a heat conducting material extends downwardly from the bottom region material,
wherein the heat conducting material having the same or a higher heat conductivity than the bottom region material.

Preferably, an additional element can be placed between the device to be cooled and the heat conducting material or the bottom region material. The purpose of this additional element is to spread the heat in directions perpendicular to the direction of heat transfer from the device to the heat conducting material or the bottom region material. For example, if the heat conducting material or the bottom region material has an upper surface which is flat and planar, and if the lower surface of the device is also planar, the additional element may be a thin mat made of material having a very high heat conducting coefficient, for example in the range of 300 to 500 W/(m*K). An example of such a mat is the SPREADERSHIELD 2-D Heat Spreader of GrafTech International, 12900 Snow Road, Parma, Ohio 44130, United States of America. Generally, Graphite materials or Carbon materials can be used as material for the additional element between the device and the heat conducting material. One advantage of such a material is that the heat is spread over the surface of the heat conducting material or the bottom region material so that the heat transfer to the heat conducting material or the bottom region material and, thereby, the heat transfer to the outside of the structure is improved. An alternative or additional purpose of this additional element is to ensure good thermal contact between the device and the bottom region material. For example, silicone can be used to ensure the thermal contact.

Alternatives for thermal interface materials are, for example: a polyimide foil, coated with phase change compound (e.g. distributed by Detakta Hans-Herbert von Saenger Isolier-und Messtechnik GmbH & Co. KG, Hans-Böckler-Ring 19, D-22851 Norderstedt, Germany, product name: ThermaPhase) and thermally conductive and electrically insulating single or multi-component polymers, optionally filled with ceramic and/or heat conducting material (e.g. distributed by Kerafol Keramische Folien GmbH, Industriegebiet Stegenthumbach 4-6, D-92676 Eschenbach, Germany, product name Keratherm). It is preferred that the additional material between the device and the bottom region material is electrically insulating, especially if the bottom region material is electrically conducting. This facilitates the insulation of the device to be cooled.

Placing the device(s) at the bottom of a cavity has the advantage that—on one hand—heat can be transferred to the underside of the cover by forced or natural convection. On the other hand, the air within the cavity is a good heat insulator if the temperature of the cover is higher than the temperature of the device(s) to be cooled. This may happen when the ambient air temperature is high and/or if sunshine has heated up the cover.

As mentioned above, there may be another material outside of the structure which is not a natural ground material. Preferably, the structure is embedded in an outer shell of a solid material having a higher heat capacity per volume of the structure than the material of the structure. Especially, the solid material may be concrete. An outer shell of concrete is easy to be made. For example, the ground in which the concrete shell is to be placed may be compressed first and then a corresponding volume of the ground may be removed. The volume corresponds to the outer shell plus the structure plus the cavity. Then, the outer shell may be produced and/or inserted in the volume. In addition, the structure may be inserted in the outer shell afterwards or at the same time as inserting or producing the outer shell. Preferably, the structure is placed in the volume first and is used to delimit the region of the outer shell while the material, in particular concrete is inserted.

If the heat conducting material at the bottom of the structure is used, as mentioned above, this heat conducting material preferably extends into the outer shell at the bottom of the structure and, more preferably, extends through the outer shell into the ground. The heat conducting material improves heat transfer to the outer shell and/or the ground below the outer shell.

In order to improve the heat transfer by convection from the device(s) within the cavity to the cover of the cavity, the structure may comprise a ventilator within the cavity for forced convection of the air within the cavity. Preferably, the structure is combined with a first temperature sensor at the cover and is combined with a second temperature sensor at the device(s) to be cooled, wherein the ventilator is combined with a control adapted to control the operation of the ventilator depending on the temperatures measured by the temperature sensors. If the temperature at the cover is higher than the temperature at the device(s) to be cooled, the ventilator may be switched off by the control. Therefore, the air within the cavity can form stable horizontally extending layers of rising temperature from bottom to top, which effectively insulates the device(s) from the cover.

Preferably, the structure is sealed against transfer of air into and out of the cavity. For example, the structure may be made of walls and there may be a seal at the upper edges of the walls to seal the cavity versus the cover. Sealing the cavity against the ambient air avoids heating of the interior of the cavity in case of high ambient temperatures. In addition, it is prevented that humid air can enter the cavity. Humid air may interfere with the devices and may lead to oxidation of electrical contacts and metal parts.

Preferably, the structure is adapted to prevent intrusion of particles and/or water into the cavity. This may be achieved by the same construction as mentioned above having the seal between the upper edges of the walls and the cover. Particles, such as dust or aerosols as well as water may interfere with the operation of the devices and/or may lead to failures of operation.

Furthermore, a method of operating a system for transferring energy to a vehicle, in particular to a track bound vehicle, such as a light rail vehicle, is proposed, wherein an electric conductor arrangement of the system is used to produce an electromagnetic field which can be received by the vehicle thereby transferring the energy to the vehicle,
   electric and/or electronic devices of the system is/are used to operate the electric conductor arrangement wherein the devices produce heat while operating the conductor arrangement and—therefore—are to be cooled,
   at least one of the devices to be cooled is operated within a cavity, while the cavity is covered by a cover limiting the cavity at the top, wherein the device(s) to be cooled is/are located at a distance to the cover, wherein the cavity is located in the ground at the path of travel of the vehicle in such a manner that the cover forms a part of the surface of the ground.
Embodiments and optional features of the method are defined by the attached claims and the description of the system applies correspondingly.

In addition, a method of operating a system for transferring energy to a vehicle, in particular to a track bound vehicle, such as a light rail vehicle, is proposed, comprising
   providing an electric conductor arrangement adapted to produce an electromagnetic field which can be received by the vehicle thereby transferring the energy to the vehicle,
   providing electric and/or electronic devices which are adapted to operate the electric conductor arrangement wherein the devices produce heat while operating the conductor arrangement and—therefore—are to be cooled,
   providing a cooling arrangement which comprises
      a structure having a cavity in which at least one of the devices to be cooled is located,
      wherein a cover is provided which limits the cavity at the top, wherein the device(s) to be cooled is/are located at a distance to the cover,
      wherein the structure is integrated in the ground at the path of travel of the vehicle in such a manner that the cover forms a part of the surface of the ground.
Embodiments and optional features of the method are defined by the attached claims and the description of the system applies correspondingly.

The electric conductor arrangement which is operated by the device(s) to be cooled may
   comprise at least one electric line extending along the path of travel of the vehicle in a serpentine manner (i.e. sections of the line which extend in the direction of travel are followed in each case by a section which extends transversely to the travel direction which in turn is followed again by a section which extends in the direction of travel); in case of a plural-phase system preferably all lines of the conductor arrangement are arranged in this manner; the expression "serpentine" covers lines having a curved configuration and/or having straight sections with sharply bent transition zones to neighbouring sections; straight sections are preferred, since they produce more homogenous fields.
   comprise at least two electric lines, wherein each line is adapted to carry a different one of phases of an alternating electric current; preferably, the electric conductor arrangement comprises three lines, each line carrying a different phase of a three-phase alternating current;
   comprise a plurality of segments, wherein each segment extends along a different section of the path of travel of the vehicle; each segment may comprise sections of the at least two lines and each segment may be adapted to be switched on and off separately of the other segments. The phase line(s) of each segment may be electrically connected to the corresponding phase line of any consecutive segment (series connection of the phase lines). Alternatively, the phase line(s) of the consecutive segments may be insulated against each other and—for example—may be connected to the power supply via a separate inverter for each segment (parallel connection of the phase lines).

A preferred application of the invention refers to the energy supply to rail vehicles. In particular, the electric conductor arrangement for producing the electromagnetic field may be located (if viewed from the top) between the two rails of the railway. For example, the electric line or electric lines of the conductor arrangement may be integrated in sleepers of the railway or may be buried in the ground.

In any case, it is preferred that the cavity which comprises the device(s) to be cooled is located sideways of one of the rails, i.e. is not located between the two rails. Therefore, the line or lines of the conductor arrangement can easily be connected with the device or devices within the cavity.

If the electric conductor arrangement comprises a plurality of segments (as mentioned above), there is preferably at least one of the cavities next to each segment, most preferred at the interface between two consecutive segments.

BRIEF DESCRIPTION OF THE DRAWINGS

Examples will be described with reference to the attached figures. The figures show.

DETAILED DESCRIPTION OF THE INVENTION

Figure 1:
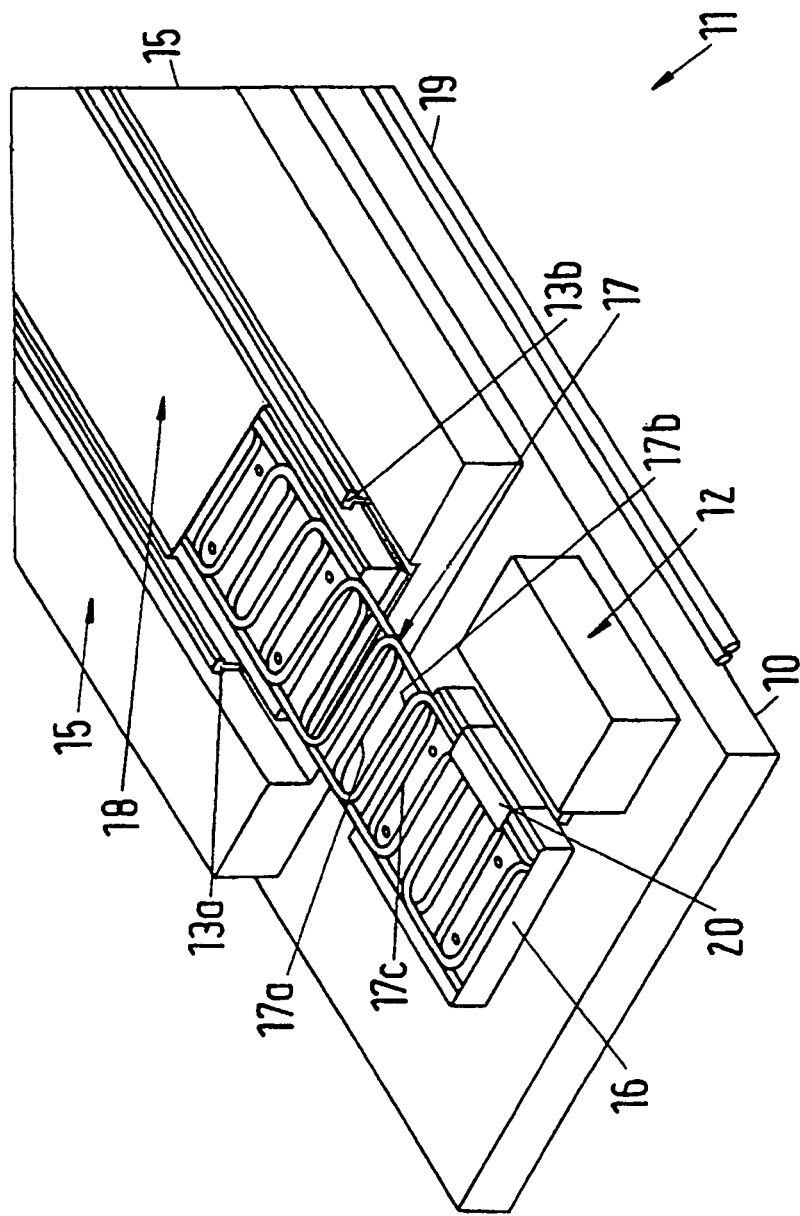
FIG. 1 a three-dimensional view of a section of a railway, wherein parts of the railway construction are cut away, FIG. 2 schematically a sectional view through a structure having a cavity, wherein the structure is embedded in a solid material within the ground, FIG. 3 schematically another sectional view through a structure having a cavity and through the track of a vehicle, FIG. 4 schematically a first embodiment of a conductor arrangement for producing an electromagnetic field in order to provide energy to a vehicle traveling on the track, FIG. 5 a section of consecutive segments of a conductor arrangement, including inverters for inverting a direct current to an alternating current for feeding the conductor arrangement.

The railway 11 shown in FIG. 1 is placed on a bottom layer 10 which may consist of natural ground material, such as soil, sand and/or rocks. However, the bottom layer 10 may alternatively be man made, such as compressed material which is typically used for construction work as base layer. On top of this bottom layer 10, at least one further layer, 15 is placed. This layer may be made of concrete, for example, but may alternatively be made of any other material which is suitable for railway construction. The region of the layer 15 in the front left area of FIG. 1 is cut away in order to show the construction of other parts of the railway. The layer 15 comprises a recess for receiving the lower part of the two rails 13a, 13b, for receiving a support material 16 which carries and/or receives a conductor arrangement 17 and for receiving other, optional parts, such as parts for fixing the rails 13 in the desired position and alignment.

The conductor arrangement 17 comprises—according to this specific embodiment—three lines 17a, 17b, 17c for carrying the three phases of a three phase alternating current. Each of the lines 17a, 17b, 17c is extending along the track defined by the rails 13, but is following a serpentine-like path. However, other ways of placing the conductor arrangement are also possible. The conductor arrangement 17 is covered by a protective layer 18 which is also arranged between the two rails 13.

On one side of the support material 16, a structure 12 is placed, i.e. the structure 12 is placed not between the rails 13, but on the outside of the two rails 13. In the specific embodiment shown in FIG. 1, the structure 12 is a rectangular parallel epiped. Details of a specific embodiment of the epiped will be described with reference to FIGS. 2 and 3. The top surface of the structure 12 extends on the same height level as the surface of layer 15. Layer 15 abuts on opposite side surfaces of the structure (not shown in FIG. 1, since layer 15 is partly cut away).

At the position of the nearest distance between the structure 12 and the conductor arrangement 17, an arrangement 20 for electrically contacting the lines 17a, 17b, 17c is placed in order to realize an electric connection between the conductor arrangement 17 and one or more than one device within the structure 12.

In the lower right part of the view shown in FIG. 1, a straight linear structure 19 can be recognized which may be used to supply electric energy to the device(s) within the structure 12. The electric connection between the structure 19 and the device(s) is not shown in FIG. 1.

The schematic view of FIG. 2 is a sectional view taken along a vertical plane through one specific embodiment of a structure 12 having a cavity 144 in which an electrical and/or electronic device 1 is placed. Instead of one device 1, two or more devices to be cooled can be placed at the bottom of the cavity 144 within the structure 12. The structure 12 may be the structure shown in FIG. 1. In this case, the vertical plane of the sectional view of FIG. 2 extends nearly parallel to the tracks 13.

The cavity 144 also comprises a ventilator 7 for forcing ventilation of air within the cavity 144, i.e. the convection of air is forced by the ventilator. Preferably, the ventilator 7 is controlled in such a manner that it is not operated if the temperature at the top of the cavity 144 is higher than the temperature of the device 1.

The structure 12 is covered by a removable cover 25. Therefore, it is possible to access the interior of the structure 12 from above.

The view shown in FIG. 1 comprises cutaway regions. In particular, the intermediate layer 14 and the cover layer 15 extend to the walls of the structure 12 so that the structure 12 is embedded with solid material on all sides except on the top side. However, not all five sides of the structure 12 may comprise the same material or the same layers of material. Rather, the gap between the structure 12 and the supporting material 16 or the contacting arrangement 20 can be filled with another material, especially material which supports the rails. Furthermore, the outside of the structure 12 which is shown in the front of FIG. 1 can be covered by another material, such as natural soil.

The structure 12 comprises a plurality of fins made of metal which extend from the bottom of the cavity 144 downwardly. The device 1 to be cooled is directly placed on the bottom wall 7 of the structure 12 which is also made of metal as the fins 3. Therefore, heat which is produced by the device 1 is transferred through the bottom wall 7 into the fins 3 and thereby into the surrounding material 2. The surrounding material 2 forms an outer shell of the structure 12, enclosing the structure 12 on five sides, the right side and the left side shown in FIG. 2, the bottom side and (not shown in FIG. 2) the front side and the back side of the structure 12. The top side above the cover 25 is free of solid material, i.e. the ambient air can pass the top side of the cover 25 and can remove heat from the cover 25. The outer shell of the structure 12 is preferably in contact with the outside of the structure's walls along the whole surface of the walls. Therefore, the heat transfer from the wall material to the material of the shell 2 is improved. The shell 2 may be made of concrete.

On the other hand, the shell 2 is embedded in ground material 4, which may be artificial (i.e. man made) and/or natural ground material.

In the embodiment shown in FIG. 2, the fins 3 do not extend from the shell 2 into the ground 4. However, heat conducting structures like the fins 3 may extend into the material below the shell in other embodiments.

Alternatively to the embodiment shown in FIG. 2, the heat conducting material at the bottom of the cavity may extend through the bottom wall 7 of the structure 12 and the device(s)

to be cooled may be placed on an additional base element which is placed at the bottom of the cavity.

The sectional view shown in FIG. 3 is taken along a vertical plane which cuts not only a structure 12 having a cavity for receiving a device or more than one device to be cooled, but also cuts the track of the vehicle which is to be provided with energy. The structure 12 shown in FIG. 3 may be the structure 12 of FIG. 2 or another structure. However, the same reference numerals are used in FIGS. 2 and 3 for the same or corresponding parts.

Again, there is an outer shell 2 in which the structure 12 is embedded. The device 1 to be cooled is placed at the bottom of the cavity 144 and a cover 25 closes the cavity 144 at the top. The track 31, i.e. the path along which the vehicle travels, also comprises one or more than one layers of material which is/are denoted by reference numeral 32 and which supports not only the vehicle, but also the conductor arrangement. The conductor arrangement and any further part of the track (such as the rails in case of a railway) are not shown in detail in FIG. 3. The supporting material 32 and the outer shell 2 of structure 12 are embedded in the ground 4.

The device to be cooled is electrically connected via a line or cable 27 which is located within the cavity 144, via a connector 35 located in an upper part of a side wall 37 of the structure 12 and via a line or cable 29 outside of the cavity 144. The number of lines or wires depends on the type of electric circuit which is realized by the conductor arrangement and the device or devices to be cooled within the cavity. One example of the electric circuit will be described in connection with FIG. 5.

Figure 4:
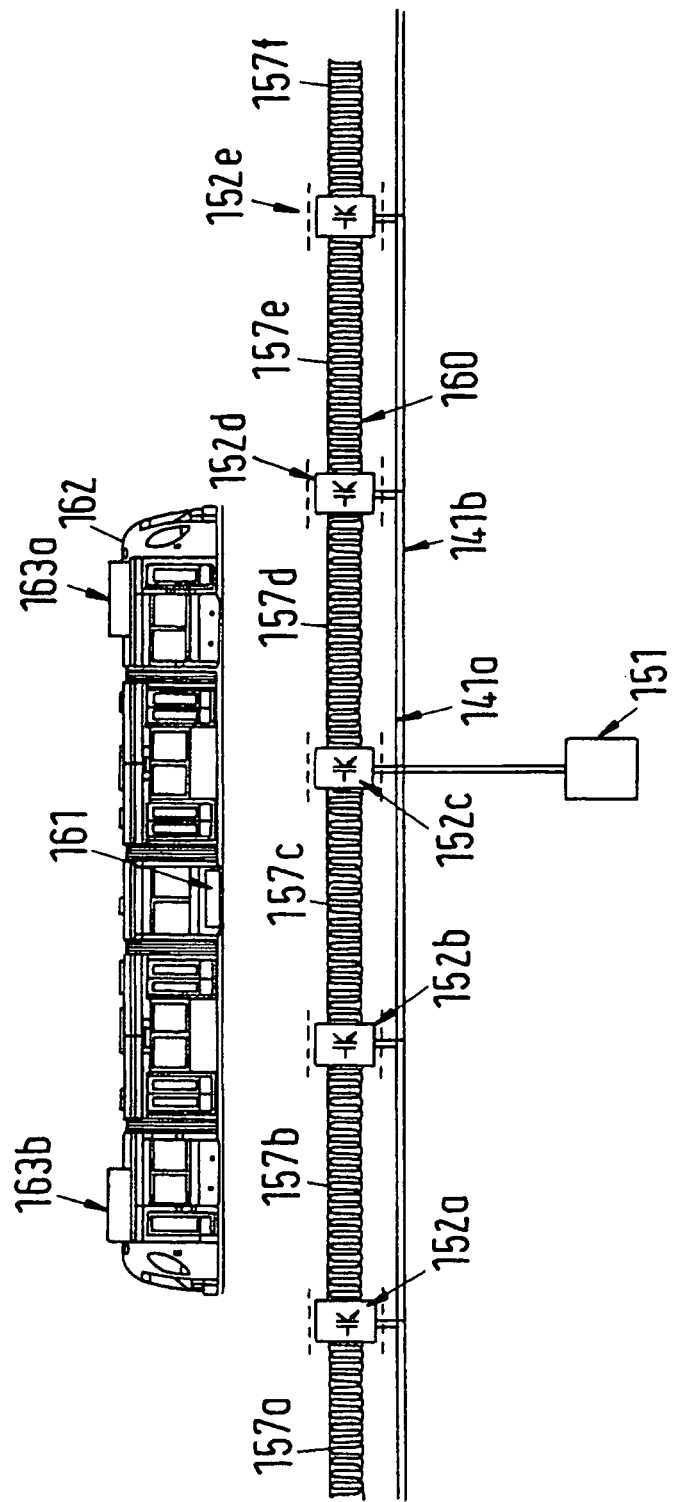

FIG. 4 shows six segments 157a to 157f of a conductor arrangement which extend along a path of travel of a vehicle 162. The segments 157 can be operated independently of each other. The vehicle 162 may comprise a receiving device 161 for receiving the electromagnetic field produced by one or more than one of the segments 157. In the situation shown in FIG. 4, the receiving device 161 is located above segment 157c and at least this segment 157c is operated to produce an electromagnetic field and to provide energy to the vehicle. Furthermore, the vehicle may comprise energy storages 163a, 163b which may be used to operate the vehicle if not sufficient energy is received from the segments 157.

At each interface between two consecutive segments 157, an inverter 152a to 152e is provided which is placed within a cavity and is thereby buried in the ground according to the invention. For example, the inverters 152 may be realized according to the circuit diagram of FIG. 5. A DC (direct current) power supply line 141a, 141b is also shown in FIG. 4. It is connected to an energy source 151, such as a power station for producing a direct current.

Figure 5:
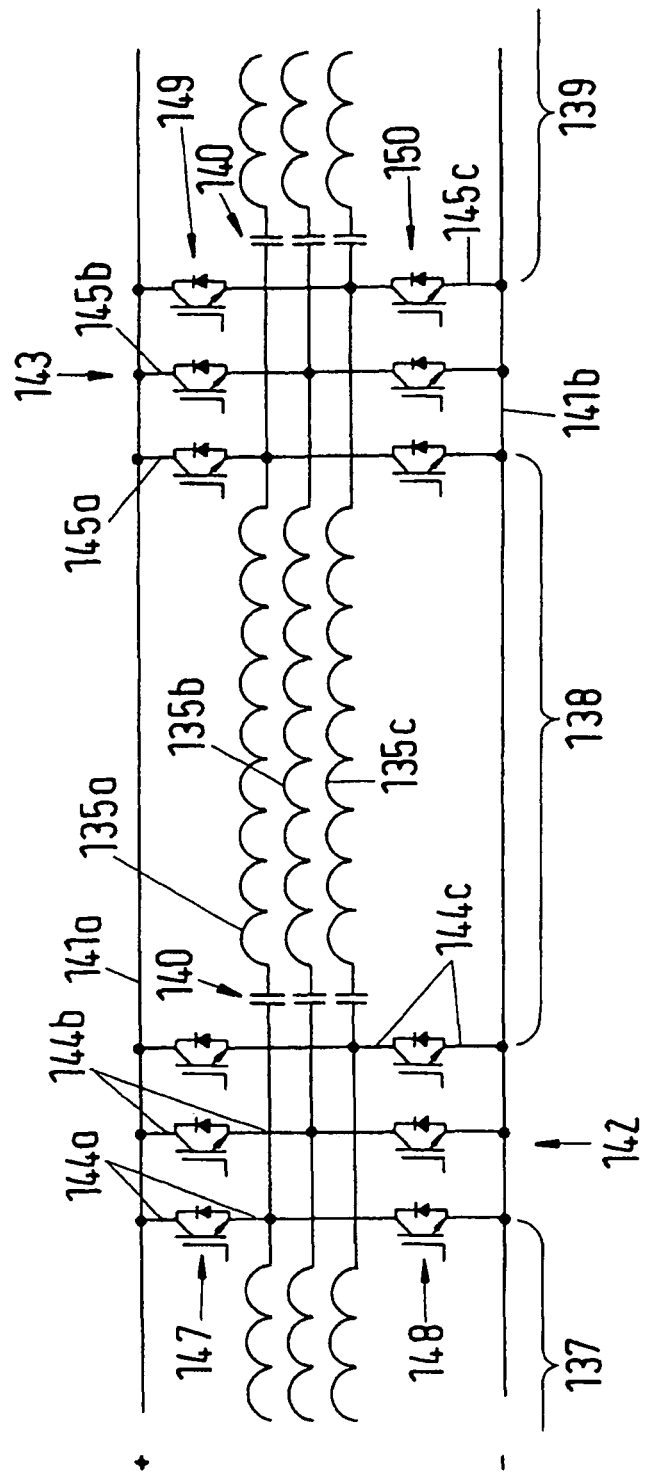

FIG. 5 shows a circuit diagram. A row of consecutive segments 137, 138, 139 of an electric conductor arrangement for producing an electromagnetic field is partially shown in the figure. Only one segment is fully shown, namely segment 138. The segments 137, 138, 139 each comprise three phase lines 135a, 135b, 135c. These phase lines 135 may be realized in the manner shown in FIG. 1, for example.

Each phase line 135 of each segment 137, 138, 139 comprises at one end of the phase line 135 a capacity 140 for compensating the inductance of the phase line 135. As a result, the impedance is zero. The capacities may be part of the devices which are located in the cavity of the structure 12 (FIGS. 1 to 3).

At the interfaces between the consecutive segments 137, 138, 139, each phase line 135 is connected to a DC power supply line 141a, 141b. Each phase line 135 is connected to plus and minus potential of the DC supply line 141 via in each case one switch 147, 148. For example, phase line 135a is connected via connection 144a to plus potential and minus potential. Within connection 144a, the switch between phase line 135a and plus potential is denoted by reference numeral 147 and the switch between the phase line 135a and minus potential is denoted by 148. The connections 144b, 144c of the phase lines 135b, 135c to plus and minus potential (lines 141a, 141b) are constructed in the same manner.

The above description of interface 142 between segment 137 and segment 138 correspondingly applies to the interface between segment 138 and segment 139. The connections between the phase lines 135 and the DC supply line 141 are denoted by reference numerals 145a, 145b, 145c. The switches between the phase lines 135 and the plus potential of line 141a are denoted by 149 and the switches to the minus potential are denoted by 150.

Consequently, each interface 142, 143 can be connected and disconnected to/from the supply line 141 by operating switches 147, 148 or 149, 150. The switches 147, 148 constitute a first inverter, together with a control of the switches 147, 148 which is not shown in FIG. 5. In the same manner, switches 149, 150 and a corresponding control for controlling the switching operations of these switches constitute a second inverter at interface 143. During operation of the inverters, the switches of the inverter are repeatedly switched on and off to produce a desired alternating current at the interface 142, 143, i.e. at the end of one of the segments 137, 138, 139. For example, the connection 144a for connecting the DC supply line 141 to phase line 135a therefore comprises a series connection of switch 147 and switch 148 wherein a connection is made between phase line 135a and a contact point between the switches 147, 148.

Each inverter may be placed in a separate cavity within the ground for cooling purposes.

However, other than shown in FIG. 5, the conductor arrangement can alternatively be connected to an alternating current line for supplying electric energy to the conductor arrangement.

The invention claimed is:

1. A system for transferring energy to a vehicle, in particular a track bound vehicle, such as a light rail vehicle, wherein
    the system comprises an electric conductor arrangement adapted to produce an electromagnetic field which can be received by the vehicle thereby transferring the energy to the vehicle and which produces an electric voltage by induction,
    the system comprises electric and/or electronic devices which are adapted to operate the electric conductor arrangement, wherein at least one of the devices comprises switches, which are repeatedly switched on and off during operation to produce a desired alternating current in the conductor arrangement, wherein the devices produce heat while operating the conductor arrangement and—therefore—are to be cooled,
    a cooling arrangement of the system comprises
    a structure having a cavity in which at least one of the devices to be cooled is located,
    wherein the structure comprises a cover limiting the cavity at the top, wherein the device(s) to be cooled is/are located at a distance to the cover,
    wherein the structure is integrated in the ground at the path of travel of the vehicle in such a manner that the cover forms a part of the surface of the ground, and
    wherein the structure is embedded in an outer shell of a solid material having a higher heat capacity per surface area of the structure than the material of the structure.

2. The system of claim 1, wherein at least one of the devices in the cavity is located at the bottom of the cavity.

3. The system of claim 2, wherein the device or devices at the bottom of the cavity is/are placed on
a heat conducting material extending downwardly through a bottom region material of the structure, or
a bottom region material of the structure, wherein a heat conducting material extends downwardly from the bottom region material, and
wherein the heat conducting material having the same or a higher heat conductivity than the bottom region material.

4. The system of claim 1, wherein the structure is sealed against transfer of air into and out of the cavity.

5. The system of claim 1, wherein the structure is adapted to prevent intrusion of particles and/or water into the cavity.

6. A method of operating a system for transferring energy to a vehicle, in particular to a track bound vehicle, such as a light rail vehicle, wherein
an electric conductor arrangement of the system is used to produce an electromagnetic field which can be received by the vehicle thereby transferring the energy to the vehicle and which produces an electric voltage by induction,
electric and/or electronic devices of the system is/are used to operate the electric conductor arrangement, wherein at least one of the devices comprises switches, which are repeatedly switched on and off during operation to produce a desired alternating current in the conductor arrangement, wherein the devices produce heat while operating the conductor arrangement and—therefore—are to be cooled,
at least one of the devices to be cooled is operated within a cavity of a structure, while the cavity is covered by a cover limiting the cavity at the top, wherein the device(s) to be cooled is/are located at a distance to the cover, wherein the structure is integrated in the ground at the path of travel of the vehicle in such a manner that the cover forms a part of the surface of the ground, and wherein the cavity is formed by a structure which is located in an outer shell of a solid material having a higher heat capacity per surface area of the structure than the material of the structure.

7. The method of claim 6, wherein at least one of the devices in the cavity is located at the bottom of the cavity while the device is operated.

8. The method of claim 7, wherein the device or devices at the bottom of the cavity is/are operated on
a heat conducting material extending downwardly through a bottom region material of the structure, or
a bottom region material of the structure, wherein a heat conducting material extends downwardly from the bottom region material, and
wherein the heat conducting material having the same or a higher heat conductivity than the bottom region material.

9. The method of claim 6, wherein the device(s) within the cavity is/are operated while the cavity is sealed against transfer of air into and out of the cavity.

10. The method of claim 6, wherein the device(s) within the cavity is/are operated while the cavity is sealed against intrusion of particles and/or water into the cavity.

11. A method of manufacturing a system for transferring energy to a vehicle, in particular to a track bound vehicle, such as a light rail vehicle, the method comprising:
providing an electric conductor arrangement adapted to produce an electromagnetic field which can be received by the vehicle thereby transferring the energy to the vehicle and which produces an electric voltage by induction,
providing electric and/or electronic devices which are adapted to operate the electric conductor arrangement, wherein at least one of the devices comprises switches, which are repeatedly switched on and off during operation to produce a desired alternating current in the conductor arrangement, wherein the devices produce heat while operating the conductor arrangement and—therefore—are to be cooled,
providing a cooling arrangement which comprises
a structure having a cavity in which at least one of the devices to be cooled is located,
wherein a cover is provided which limits the cavity at the top, wherein the device(s) to be cooled is/are located at a distance to the cover,
wherein the structure is integrated in the ground at the path of travel of the vehicle in such a manner that the cover forms a part of the surface of the ground, and
wherein the structure is embedded in an outer shell of a solid material having a higher heat capacity per surface area of the structure than the material of the structure.

12. The method of claim 11, wherein at least one of the devices in the cavity is located at the bottom of the cavity.

13. The method of claim 12, wherein the device or devices at the bottom of the cavity is/are placed on
a heat conducting material extending downwardly through a bottom region material of the structure, or
a bottom region material of the structure, wherein a heat conducting material extends downwardly from the bottom region material, and
wherein the heat conducting material having the same or a higher heat conductivity than the bottom region material.

14. The method of claim 11, wherein the structure is sealed against transfer of air into and out of the cavity.

15. The method of claim 11, wherein the structure is adapted to prevent intrusion of particles and/or water into the cavity.

* * * * *